(12) United States Patent
McKay

(10) Patent No.: US 6,782,280 B1
(45) Date of Patent: Aug. 24, 2004

(54) SYSTEM AND METHOD FOR RAPID TEXT ENTRY IN TELEPHONE

(75) Inventor: Kyle J. McKay, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 10/229,611

(22) Filed: Aug. 27, 2002

(51) Int. Cl.⁷ .................................................. H04M 1/00
(52) U.S. Cl. .................... 455/566; 455/550; 455/158.5; 455/575; 379/433.01
(58) Field of Search ............................. 455/566, 575, 455/90, 550, 556, 158.5, 186.2; 345/157, 800; 379/433.01, 370, 433.04, 433.13

(56) References Cited

U.S. PATENT DOCUMENTS

| | | | |
|---|---|---|---|
| 6,580,932 B1 * | 6/2003 | Kim et al. .................. 455/566 |
| 6,724,892 B1 * | 4/2004 | Mason et al. .......... 379/433.06 |
| 2002/0045463 A1 * | 4/2002 | Chen et al. .................. 455/566 |
| 2003/0017844 A1 * | 1/2003 | Yu .............................. 455/556 |
| 2003/0073414 A1 * | 4/2003 | Capps ......................... 455/90 |
| 2003/0197739 A1 * | 10/2003 | Bauer ......................... 345/800 |

* cited by examiner

*Primary Examiner*—Nick Corsaro
*Assistant Examiner*—Tan Trinh
(74) *Attorney, Agent, or Firm*—Philip R. Wadsworth; Sandip (Micky) S. Minhas; Abdollah Katbab

(57) ABSTRACT

Rapid text entry using a wireless telephone is facilitated by correlating at least some of the letters represented by a number key to a two-key combination, namely, the number key and an indicator key such as the star key (which, when depressed along with a number key, can indicate the second letter on the number key) and the pound key (which, when depressed with a number key, can indicate the third letter on the key). Thus, at most two key strokes are required to positively indicate any letter on a numbers-only keypad.

18 Claims, 1 Drawing Sheet

SYSTEM AND METHOD FOR RAPID TEXT ENTRY IN TELEPHONE

FIELD OF THE INVENTION

The present invention relates generally to communication systems, and more particularly to text entry into wireless communication devices.

BACKGROUND OF THE INVENTION

Wireless communication devices have become ubiquitous. Devices such as wireless telephones include so-called mobile station modems (MSM) that essentially are wireless communication computers which, like all digital computers, execute software to undertake the functions desired by the user.

Among the functions telephones, including wireless telephones, can undertake is facilitating text entry by a user. More particularly, it is sometimes the case that a user calling another party will be prompted to enter short text messages, such as when a person telephones a company and is directed by an automated system to enter the letters of the name of the person sought to be reached. This can be accomplished by depressing the number keys 2–9, which are correlated to letters.

Because each number key corresponds to three and in some cases four letters, however, provision must be made for allowing the user to select the desired one of the three or four letters represented by a number key. One way this is accomplished is through multitap, wherein the user depresses the relevant number key once for the first letter represented by the key, twice for the second, etc. This approach suffers the drawback of requiring up to four taps for one letter, and it also requires a user to wait until a timeout period has elapsed to select two or more letters in a row from the same key.

Another method for facilitating text entry using a telephone number pad is to provide an electronic dictionary in the phone that can be searched using heuristic algorithms to find a match for an entered sequence of key strokes. If more than one match is possible, the candidates are presented on a display to allow the user to select the intended text string. This can be cumbersome, and storing an electronic dictionary can consume considerable data storage resources in the phone. Moreover, in the case of names, for instance, which do not appear in the dictionary, the desired string might not be returned at all. Having made these critical observations, the present invention is provided.

SUMMARY OF THE INVENTION

A method for inputting text using a telephone includes, for at least one letter sought to be input, manipulating a number key representing letters in combination with manipulating one other key.

In another aspect, a method for text entry using a telephone having number keys includes manipulating a number key representing plural letters, and manipulating an indicator key on the telephone. If the number key and indicator key are manipulated within a predetermined time period of each other, a single one of the letters represented by the number key is returned, i.e., is input as text. The predetermined time period may be zero, i.e., the two keys might have to be manipulated simultaneously with each other.

In a preferred embodiment, a correspondence is established between each letter represented by each number key that has letters and a combination of the number key representing the letter and an indicator key. The indicator key can be the star key, the pound sign key, a number key such as "0" or "1" that does not conventionally represent any letters, or some other key. Using a conventional telephone keypad scheme, the number keys representing letters are keys representing the numbers 2–9. Accordingly, depressing the star key along with a number key can indicate the second letter represented by the number key, while depressing the pound sign key along with a number key can indicate the third letter represented by the number key.

In another aspect, a system is disclosed that has plural number keys (such as the keys 2–9), each representing plural letters, and at least one indicator key, such as the star key and pound sign key. A correspondence is established between a single letter and a combination of one and only one number key, and one and only one indicator key, such that the keys can be manipulated in combination with each other to enter the single letter as text.

In still another aspect, a communication device includes number keys representing a respective number and respective plural letters, and a processor executing logic to return a predetermined letter only if two and only two keys that are precorrelated to the predetermined letter are manipulated in accordance with a letter entry protocol.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
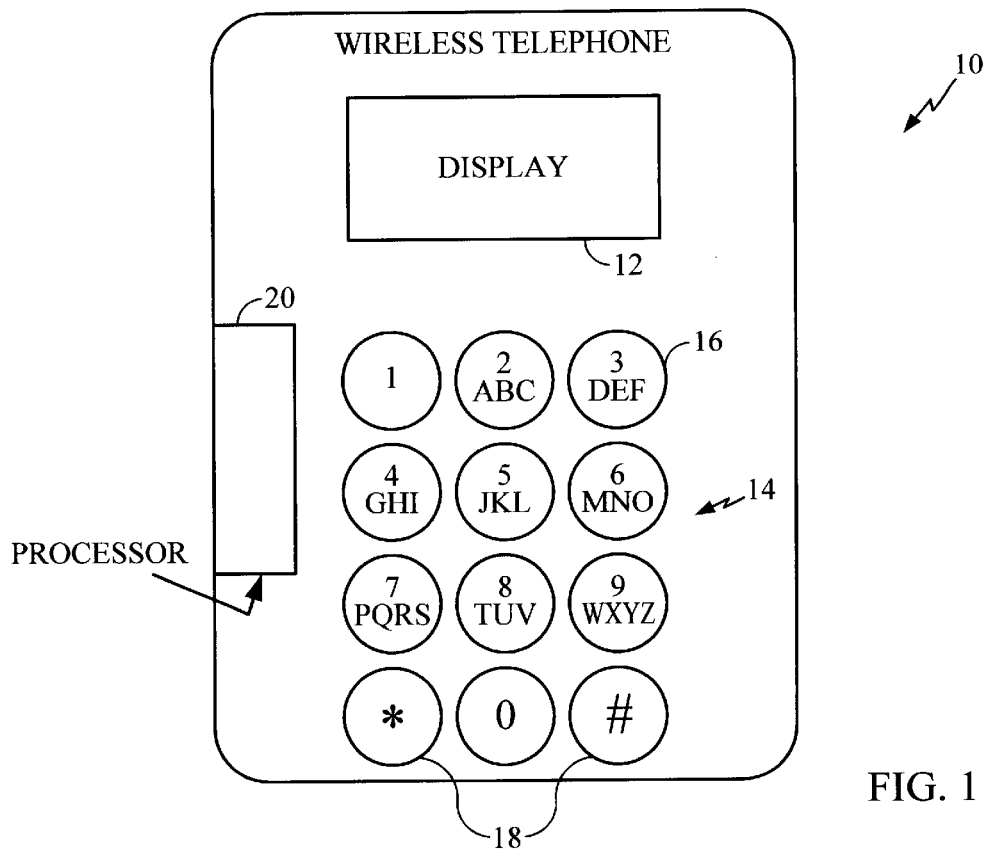
FIG. 1 is a schematic diagram of a telephone.

Referring initially to FIG. 1, a communication device is shown, generally designated 10, for facilitating computer data and/or voice communication in a communication network. The device 10 is configured as a telephone, and in a preferred implementation is a wireless communication device, although the principles advanced herein can apply to text entry using landline telephones as well.

In one non-limiting preferred implementation the device 10 is a code division multiple access (CDMA) mobile station that, e.g., uses cdma2000, cdma2000 3x, or cdma2000 high data rate (HDR) principles, or other CDMA principles. In one non-limiting embodiment the wireless communication device 10 is a mobile telephone made by Kyocera, Samsung, or other manufacturer that uses Code Division Multiple Access (CDMA) principles and CDMA over-the-air (OTA) communication air interfaces. The present invention, however, applies to other mobile stations such as laptop computers, wireless handsets or telephones, data transceivers, or paging and position determination receivers. The wireless communication device 10 can be hand-held or portable as in vehicle-mounted (including cars, trucks, boats, planes, trains), as desired. However, while wireless communication devices are generally viewed as being mobile, it is to be understood that the present invention can be applied to "fixed" units in some implementations. Also, the present invention applies to data modules or modems used to transfer voice and/or data information including digitized video information, and may communicate with other devices using wired or wireless links.

Further, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as "users" and "mobiles" in some communication systems. It is to be understood that the present invention applies equally to other types of wireless devices including without limitation GSM devices, time division multiple access (TDMA) systems, etc.

FIG. 1 shows that the communication device 10 includes a display 12 such as but not limited to a flat panel display. Also, the communication device 10 includes a key area 14 on which are mounted number keys 16 in accordance with principles known in the art. Non-number keys 18, such as a star key and a pound sign key, may also be provided.

In the embodiment shown in FIG. 1, no separate letter keys are provided and the keypad consequently is a numeric keypad. Accordingly, in addition to the numbers they represent, the number keys 16 also represent letters according to the following convention. "2" represents a, b, and c, "3" represents d, e, and f, "4" represents g, h, and i, "5" represents j, k, and l, "6" represents m, n, and o, "7" represents p, q, r, and s, "8" represents t, u, and v, and "9" represents w, x, y, and z. It is to be understood that other key layouts and other number-to-letter correlations can be used. In any case, at least some of the number keys represent one numeral and two or more letters.

Figure 2:
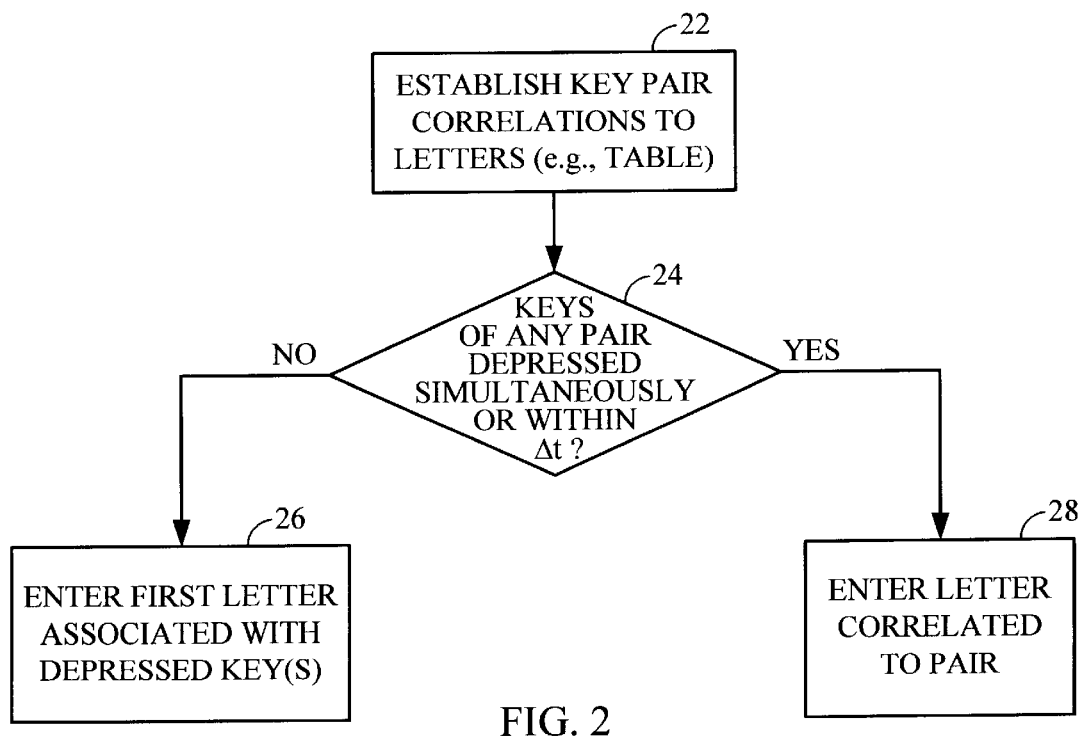
FIG. 2 is a flow chart of the present logic.

FIG. 2 shows the logic by which rapid text entry is facilitated by the present invention. The logic shown in FIG. 2 is executed by a processor 20, schematically shown in FIG. 1, within the communication device 10. Initially, as indicated at block 22, key pair correlations to letters are established and stored in the communication device 10. In one non-limiting illustrative example, it might be established that depressing any number key 2–9 once represents the first letter of that key, whereas combining a number key 2–9 with the star key represents the second letter of that key, although if desired all letters can be represented by a two-key combination. Further, it might be established that the pound key along with a number key 2–9 represents the third letter of the number key, and combining, e.g., "0" or "1" (which do not represent any letters in the present example) with a number key 7 or 9 represents the fourth letter of that key. In any case, it may now be appreciated that any letter can be represented by no more than two key strokes, preferably a stroke of a key representing both a number and plural letters in combination with the stroke of a key not representing any letters (also referred to below as an "indicator" key).

Decision diamond 24 represents the present process when text entry is desired, once the above key-letter correlations are established. If any two keys are not depressed or otherwise manipulated simultaneously (or alternatively within a predetermined, generally very short time period of each other), the logic moves to block 26 to correlate the manipulation of any number key 2–9 that was manipulated to the first letter represented by that key. When all letters are represented by a two-key combination, depressing only a single number key can indicate only the number associated with the key, and not any of its letters.

On the other hand, using the above non-limiting key pair correlations, if the star key is depressed at the same time as is a number key 2–9 (or within the short predetermined time period), the two key strokes are correlated to the second letter represented by the number key, and so the second letter is returned by the processor 20. Still further, using the above non-limiting key pair correlations, if the pound key is depressed simultaneously with a number key 2–9 (or within the short predetermined time period), the two key strokes are correlated to the third letter represented by the number key, and so the third letter is returned by the processor. In any case, the preferred embodiment envisions at least some letters being established by a combination of two key strokes, one stroke of a number key representing letters and one stroke of an indicator key.

While the preferred embodiment envisions indicating a desired letter using two-key combinations consisting of a number key with letters and a non-letter ("indicator") key, the principles advanced herein can also apply to other, less preferred two-key combinations. For instance, if one number key representing letters is depressed and held down, and then a second number key is depressed, the first key depressed can be considered by the processor 20 to be an indicator key that indicates the desired entry of the second (or other) letter of the second key that is depressed.

While the particular SYSTEM AND METHOD FOR RAPID TEXT ENTRY IN TELEPHONE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act".

What is claimed is:

1. A method for text entry using a telephone having number keys thereon, each number key representing a single number, the method comprising:

manipulating a number key representing plural letters;

manipulating an indicator key on the telephone, the indicator key being different from the number keys; and if the number key and indicator key are manipulated simultaneously, returning a single one of the letters represented by the number key.

2. The method of claim 1, further comprising:

establishing a correspondence between each letter represented by each number key having letters and a combination of the number key representing the letter and an indicator key.

3. The method of claim 2, wherein the indicator key is a star key.

4. The method of claim 2, wherein the indicator key is a pound sign key.

5. The method of claim 1, wherein the number keys representing letters are keys representing the numbers 2–9.

6. The method of claim 5, wherein the single one of the letters returned is a second letter represented by the number key.

7. The method of claim 5, wherein the single one of the letters returned is a third letter represented by the number key.

8. The method of claim 1, wherein the telephone is a wireless telephone.

9. A system, comprising:

plural number keys each representing plural letters;

at least one indicator key, the indicator key being different from the number keys; and a correspondence between at least one single letter and: a combination of one and only one number key, and one and only one indicator key such that the keys can be manipulated in combination with each other to enter the single letter as text, wherein the single letter is entered only if the number key and the indicator key are manipulated simultaneously.

10. The system of claim 9, wherein the keys are on a telephone.

11. The system of claim 10, wherein the telephone is a wireless telephone.

12. The system of claim 9, wherein the indicator key is a star key.

13. The system of claim 9, wherein the indicator key is a pound sign key.

14. The system of claim 9, wherein the number keys representing letters are the keys representing the numbers 2–9.

15. The system of claim 14, wherein the single letter is a second letter represented by its number key.

16. The system of claim 14, wherein the single letter is a third letter represented by its number key.

17. A system for text entry using a telephone, comprising:

plural input means on the telephone, each representing a single number and plural letters for manipulation thereof to input data;

indicator means on the telephone for manipulation to input data, the indicator means being different from the input means; and means for returning a single one of the letters represented by an input means if the input means and indicator means are manipulated simultaneously.

18. The system of claim 17, further comprising:

establishing a correspondence between each letter represented by each input means and a combination of the input means representing the letter and an indicator means.

* * * * *